(12) United States Patent
Wang et al.

(10) Patent No.: US 12,369,217 B2
(45) Date of Patent: Jul. 22, 2025

(54) DEVICE DISCONNECTION PROCESSING METHOD AND APPARATUS, MOBILE TERMINAL, AND STORAGE MEDIUM

(71) Applicant: SHENZHEN TCL NEW TECHNOLOGY CO., LTD., Guangdong (CN)

(72) Inventors: Yunhua Wang, Guangdong (CN); Tao Li, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 429 days.

(21) Appl. No.: 18/002,459

(22) PCT Filed: Jul. 7, 2021

(86) PCT No.: PCT/CN2021/105084
§ 371 (c)(1),
(2) Date: Dec. 19, 2022

(87) PCT Pub. No.: WO2021/254525
PCT Pub. Date: Dec. 23, 2021

(65) Prior Publication Data
US 2023/0262813 A1    Aug. 17, 2023

(30) Foreign Application Priority Data
Jun. 19, 2020  (CN) .......................... 202010570856.8

(51) Int. Cl.
H04W 76/19    (2018.01)
(52) U.S. Cl.
CPC .................................. H04W 76/19 (2018.02)

(58) Field of Classification Search
None
See application file for complete search history.

(56) References Cited

U.S. PATENT DOCUMENTS 10,362,618 B2 * 7/2019 Shirai .................. H04W 40/34
2008/0146191 A1 * 6/2008 Matsukuma .......... H04M 15/00
455/406

(Continued)

FOREIGN PATENT DOCUMENTS

CM    111178462 A        5/2020
CN    102368873 A  *    3/2012

(Continued)

OTHER PUBLICATIONS

International Search Report in International application No. PCT/CN2021/105084, mailed on Oct. 11, 2021.

(Continued)

*Primary Examiner* — Andrew C Oh
(74) *Attorney, Agent, or Firm* — PV IP PC; Wei Te Chung

(57) ABSTRACT

A device disconnection processing method includes determining a disconnected smart device according to a current connection thread and a stored smart device information, determining a corresponding wireless reconnection mode based on a disconnection duration, re-establishing a wireless connection with the disconnected smart device based on the wireless reconnection mode, marking a wireless connection mode, monitoring an external network, and determining a data transmission mode based on the wireless connection mode and the external network for data transmission based on the data transmission mode with the reconnected disconnected smart device.

20 Claims, 1 Drawing Sheet

---

Determining a disconnected smart device according to a current connection thread and a stored smart device information — S101

↓

Determining a corresponding wireless reconnection mode based on a disconnection duration, re-establishing a wireless connection with the disconnected smart device based on the wireless reconnection mode, and marking a wireless connection mode — S102

↓

Monitoring an external network and determining a data transmission mode based on the wireless connection mode and the external network for data transmission based on the data transmission mode with the reconnected disconnected smart device — S103

(56) References Cited

U.S. PATENT DOCUMENTS

| | | | |
|---|---|---|---|
| 2014/0185469 A1* | 7/2014 | Marmolejo-Meillon | .................... H04W 4/00 370/332 |
| 2017/0048915 A1* | 2/2017 | Shor | ..................... H04W 76/19 |
| 2018/0098375 A1 | 4/2018 | Iinuma | |
| 2021/0345140 A1* | 11/2021 | Meingast | .............. H04W 24/08 |

FOREIGN PATENT DOCUMENTS

| | | | | |
|---|---|---|---|---|
| CN | 104469840 A | | 3/2015 | |
| CN | 104753957 A | | 7/2015 | |
| CN | 104837216 A | * | 8/2015 | |
| CN | 105472542 A | | 4/2016 | |
| CN | 107484169 A | | 12/2017 | |
| CN | 108733607 A | | 11/2018 | |
| CN | 109286593 A | | 1/2019 | |
| CN | 110636486 A | | 12/2019 | |
| CN | 110913416 A | | 3/2020 | |
| CN | 112333849 A | | 2/2021 | |
| ES | 2229735 T3 | * | 4/2005 | .......... A61M 39/045 |
| JP | 2001352580 A | * | 12/2001 | |
| JP | 2006128825 A | * | 5/2006 | |
| JP | 2020010326 A | * | 1/2020 | ............. H04L 69/03 |
| RU | 2645757 C2 | * | 2/2018 | ............. H04W 4/70 |
| WO | WO-2016034297 A1 | * | 3/2016 | ............... A61K 1/14 |
| WO | 2018236290 A1 | | 12/2018 | |

OTHER PUBLICATIONS

Written Opinion of the International Search Authority in International application No. PCT/CN2021/105084, mailed on Oct. 11, 2021.
Chinese Office Action issued in corresponding Chinese Patent Application No. 202010570856.8 dated Aug. 8, 2022, pp. 1-8.
European Search Report in European application No. 21825887.9, mailed on Aug. 6, 2024.

* cited by examiner

DEVICE DISCONNECTION PROCESSING METHOD AND APPARATUS, MOBILE TERMINAL, AND STORAGE MEDIUM

This application is a US national phase application based upon an International Application No. PCT/CN2021/105084, filed on Jul. 7, 2021, which claims priority to Chinese Application No. 202010570856.8, filed on Jun. 19, 2020. The entire disclosures of the above application are incorporated herein by reference.

FIELD OF THE DISCLOSURE

The present application relates to the field of device connection technologies, and more particularly, to a device disconnection processing method and apparatus, a mobile terminal, and a storage medium.

BACKGROUND

With the rapid development of artificial intelligence, current smart robots, smart nursing, smart watches, smart TVs, and other smart devices can provide wireless network connection with mobile phones and perform data transmission and control through wireless connection. The current wireless connection is easy to disconnect, and the lack of an automatic restart mechanism after the connection is disconnected may seriously affect the normal operation and experience of smart devices.

SUMMARY

Technical Problem

How to solve the issues that the current wireless connection is easy to disconnect, and there is a lack of an automatic restart mechanism after the connection is disconnected, which seriously affects the normal operation and use experience of smart devices.

Technical Solution

The present application provides a device disconnection processing method and apparatus, a mobile terminal, and a storage medium, aiming to realize automatic connection of smart devices after disconnection, ensure normal operation of smart devices, and improve user experience.

In order to achieve the above purpose, the present application provides a device disconnection processing method, wherein the method is applied to a mobile terminal, and the method comprises:
  determining a disconnected smart device according to a current connection thread and a stored smart device information;
  determining a corresponding wireless reconnection mode based on a disconnection duration, re-establishing a wireless connection with the disconnected smart device based on the wireless reconnection mode, and marking a wireless connection mode; and
  monitoring an external network and determining a data transmission mode based on the wireless connection mode and the external network for data transmission based on the data transmission mode with the reconnected disconnected smart device.

Preferably, the wireless connection mode comprises a Bluetooth connection mode, a Wi-Fi connection mode, and a data connection mode, the external network comprises 4G, 5G, and Wi-Fi, and the data transmission mode comprises a double-speed transmission mode and a normal transmission mode;
  determining the data transmission mode based on the wireless connection mode and the external network comprises:
  if the wireless connection mode is the data connection mode and the external network is 5G, then the data transmission mode is determined as the double-speed transmission mode, and a data transmission rate in the double-speed transmission mode is determined according to a calculation result of multiplying a number of disconnected smart devices by a basic rate;
  if the wireless connection mode is the data connection mode and the external network is 4G or Wi-Fi, then the data transmission mode is determined as the normal transmission mode, and a data transmission rate in the normal transmission mode is determined according to the number of disconnected smart devices plus the calculation result of the basic rate; and
  if the wireless connection mode is the Bluetooth connection mode or the Wi-Fi connection mode and the external network is 5G, 4G or Wi-Fi, the data transmission mode is determined as the normal transmission mode.

Preferably, determining the corresponding wireless reconnection mode based on the disconnection duration and re-establishing the wireless connection with the disconnected smart device based on the wireless reconnection mode comprises:
  acquiring the disconnection duration and comparing the disconnection duration with a preset duration;
  if the disconnection duration is less than the preset duration, a disconnection mode is determined to be an instantaneous disconnection mode, and if the disconnection duration is greater than or equal to the preset duration, the disconnection mode is determined to be a medium-long disconnection mode;
  if the disconnection mode is the instantaneous disconnection mode, the wireless reconnection mode is determined as: starting a countdown, when a duration of the countdown reaches an expected delay, initiating a connection request, and re-establishing the wireless connection based on the connection request and the disconnected smart device; and
  if the disconnection mode is the medium-long disconnection mode, the wireless reconnection mode is determined as: directly initiating the connection request and re-establishing the wireless connection with the disconnected smart device based on the connection request.

Preferably, before determining the disconnected smart device according to the current connection thread and the stored smart device information, the method further comprises:
  acquiring one or more connected smart devices, and storing a smart device information of the one or more smart devices, wherein the smart device information comprises a device name and a device unique identifier; and
  acquiring the wireless connection mode of the connected one or more smart devices and storing the wireless connection mode in association with the smart device information.

Preferably, determining the disconnected smart device according to the current connection thread and the stored smart device information comprises:

acquiring a number of threads of the current connection thread and acquiring a number of information of stored smart device information;

comparing the number of threads with the number of information and if the number of threads is less than the number of information, determining that there is the disconnected smart device;

acquiring a current connection smart device information of a currently connected smart device based on the current connection thread; and screening based on the current connection smart device information and the stored smart device information, acquiring a smart device with missing information in the current connection smart device information, and determining the smart device with missing information as the disconnected smart device.

Preferably, initiating the connection request and re-establishing the wireless connection with the disconnected smart device based on the connection request comprises:

acquiring the wireless connection mode of the disconnected smart device and extracting a verification information of a disconnected smart device information from a cache area; and sending the connection request comprising the wireless connection mode and the verification information to the disconnected smart device, such that the disconnected smart device performs connection verification based on the verification information and completes a re-establishment of the wireless connection after a verification is successful.

Preferably, before determining the corresponding wireless reconnection mode based on the disconnection duration, the method further comprises:

acquiring a network disconnection mode of the disconnected smart device, wherein the network disconnection mode comprises a normal disconnection and an abnormal disconnection; and if the network disconnection mode is the abnormal disconnection, performing a step of: determining the corresponding wireless reconnection mode based on the disconnection duration.

Preferably, after monitoring the external network and determining the data transmission mode based on the wireless connection mode and the external network, the method further comprises:

displaying a message uploaded by the smart device based on the data transmission mode in a preset message display field of a display interface of a mobile terminal; or reading data in a database of the smart device through a preset interface and displaying the data in a preset message display field of a display interface of a mobile terminal.

In addition, in order to achieve the above purpose, the present application further provides a device disconnection processing device, comprising:

a first determiner configured to determine a disconnected smart device according to a current connection thread and a stored smart device information;

an establishing circuit configured to determine a corresponding wireless reconnection mode based on a disconnection duration, re-establish a wireless connection with the disconnected smart device based on the wireless reconnection mode, and mark a wireless connection mode; and a second determiner configured to monitor an external network and determine a data transmission mode based on the wireless connection mode and the external network for data transmission based on the data transmission mode with the reconnected disconnected smart device.

In addition, in order to achieve the above purpose, the present application further provides a mobile terminal, and the mobile terminal comprises a processor, a memory, and a device disconnection processing program stored in the memory, wherein when the device disconnection processing program is run by the processor, the device disconnection processing method is executed.

In addition, in order to achieve the above purpose, the present application further provides a computer storage medium (referred to as storage medium), wherein a device disconnection processing program is stored on the computer storage medium, when the device disconnection processing program is run by the processor, the device disconnection processing method is executed.

Compared with the prior art, the present application discloses a device disconnection processing method and apparatus, a mobile terminal, and a storage medium. The method is applied to a mobile terminal, and the method comprises determining a disconnected smart device according to a current connection thread and a stored smart device information; determining a corresponding wireless reconnection mode based on a disconnection duration, re-establishing a wireless connection with the disconnected smart device based on the wireless reconnection mode, and marking a wireless connection mode; and monitoring an external network and determining a data transmission mode based on the wireless connection mode and the external network for data transmission based on the data transmission mode with the reconnected disconnected smart device. As a result, monitoring the wireless connection thread determines the disconnected smart device, automatically re-establishes a connection with the disconnected smart device, and transmits data according to the data transmission mode, which realizes the automatic connection of the smart device after the disconnection and ensures the normal operation of the smart device. The operation improves the user experience.

Beneficial Effect

Determine the disconnected smart device by monitoring the wireless connection thread, automatically re-establish the connection with the disconnected smart device, and data transmission is carried out according to the data transmission mode, which realizes the automatic connection of intelligent devices after disconnection. This ensures the normal operation of the smart device and improves the user experience.

The realization, functional characteristics, and advantages of the purpose of the present application will be further described with reference to the accompanying drawings in conjunction with the embodiments.

DETAILED DESCRIPTION OF EMBODIMENTS

Embodiments of the Present Invention

The realization, functional characteristics, and advantages of the purpose of the present application will be further described with reference to the accompanying drawings in conjunction with the embodiments.

It should be understood that the specific embodiments described herein are only used to explain the present application, but not to limit the present application.

The mobile terminal mainly involved in the embodiments of this application refers to a wireless connection device capable of realizing wireless connection, and the mobile terminal may be a server, a cloud platform, or the like. In addition, the mobile terminal involved in the embodiment of the present application may be a mobile network device such as a mobile phone and a tablet computer.

Figure 1:
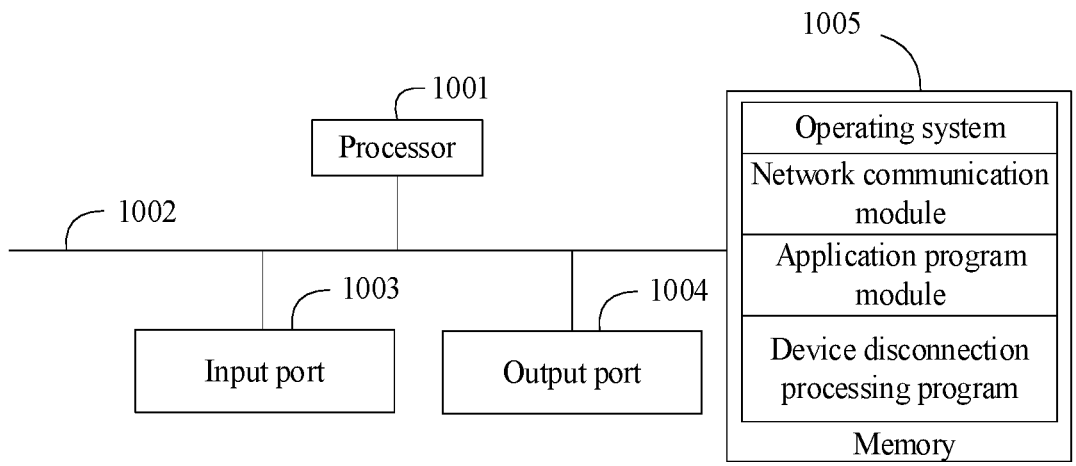
FIG. 1 is a schematic diagram of a hardware structure of a mobile terminal involved in various embodiments of the present application.

Referring to FIG. 1, FIG. 1 is a schematic diagram of a hardware structure of a mobile terminal involved in various embodiments of the present application. In this embodiment of the present application, the mobile terminal may include a processor 1001 (for example, a central processing unit, CPU), a communication bus 1002, an input port 1003, an output port 1004, and a memory 1005. The communication bus 1002 is used to implement the connection communication between these components. The Input port 1003 is used for data input. The output port 1004 is used for data output. The memory 1005 may be a high-speed RAM memory, or may be non-volatile memory, such as disk memory. Optionally, the memory 1005 may also be a storage device independent of the aforementioned processor 1001. Those skilled in the art can understand that the hardware structure shown in FIG. 1 does not constitute a limitation to the present application, and may include more or less components than shown, or combine some components, or arrange different components.

Continuing to refer to FIG. 1, the memory 1005 as a storage medium in FIG. 1 may include an operating system, a network communication module, an application program module, and a device disconnection processing program. In FIG. 1, the network communication module is mainly used to connect to the server and perform data communication with the server. The processor 1001 may call the device disconnection processing program stored in the memory 1005 and execute the device disconnection processing method provided by the embodiment of the present application.

The embodiment of the present application provides a device disconnection processing method.

Figure 2:
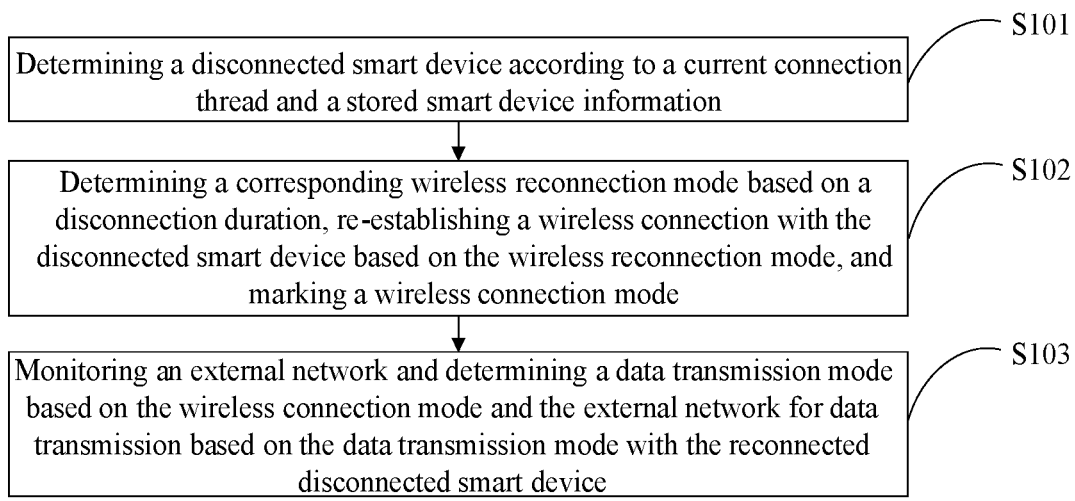
FIG. 2 is a schematic flowchart of a first embodiment of a device disconnection processing method according to the present application.

Referring to FIG. 2, FIG. 2 is a schematic flowchart of a first embodiment of a device disconnection processing method according to the present application.

In this embodiment, the device disconnection processing method is applied to a mobile terminal, and the method includes:

Step S101, determining a disconnected smart device according to a current connection thread and a stored smart device information;

Smart devices include robots, smart caregivers, smart watches, learning machines, smart TVs, smart doorbells, smart washing machines, smart sweepers, smart cameras, etc. Generally, the user can directly control the smart device to operate through the screen, buttons, remote control, and other control devices of the smart device. With the development of network and artificial intelligence, mobile terminals can wirelessly connect smart devices, then control and monitor the operation of smart devices based on the connection with the smart devices and view the relevant operating results.

In this embodiment, the mobile terminal establishes a wireless connection with one or more smart devices in advance, and the wireless connection mode may be a Bluetooth connection, a Wi-Fi connection, and a data connection. The data connection refers to a connection based on a cellular network or traffic data service provided by a communication operator. The disconnection mentioned in this embodiment means that the data connection between the smart device and the mobile terminal is disconnected, the smart device cannot continue to communicate with the mobile terminal after the disconnection, and the data connection needs to be re-established before normal communication.

In this embodiment, before determining the disconnected smart device according to the current connection thread and the stored smart device information, the method further includes:

acquiring one or more connected smart devices, and storing a smart device information of the one or more smart devices, wherein the smart device information comprises a device name and a device unique identifier; and acquiring the wireless connection mode of the connected one or more smart devices and storing the wireless connection mode in association with the smart device information.

Specifically, the mobile terminal creates a connection thread for each smart device that needs to establish a wireless connection and obtains the smart device information of the smart device during the connection establishment process. The smart device information includes a device name and a device unique identifier, wherein the device unique identifier includes but is not limited to an international mobile equipment identity (IMEI) and a unique device identifier (UDID).

In this embodiment, the wireless connection mode of the connected one or more smart devices also needs to be acquired. The connection mode can be obtained based on information in a connection request during a process of establishing the connection with the smart device, or the wireless connection mode of each smart device can be obtained from a wireless connection list of each connection method in the mobile terminal. For example, if the connection request of a certain smart device is a Bluetooth connection, the corresponding wireless connection mode is the Bluetooth connection. If the smart device A is included in a Wi-Fi connection list of the mobile terminal, the connection mode between the smart device A and the mobile terminal is a Wi-Fi connection.

Further, determining the disconnected smart device according to the current connection thread and the stored smart device information includes:

acquiring a number of threads of the current connection thread and acquiring a number of information of stored smart device information;

comparing the number of threads with the number of information and if the number of threads is less than the number of information, determining that there is the disconnected smart device;

acquiring a current connection smart device information of a currently connected smart device based on the current connection thread; and screening based on the current connection smart device information and the stored smart device information, acquiring a smart device with missing information in the current connection smart device information, and determining the smart device with missing information as the disconnected smart device.

Specifically, the number of threads of the current connection thread is obtained. Because one smart device corresponds to one connection thread, the number of threads is the number of currently connected smart devices. The number of stored smart device information corresponds to the number of successfully connected smart devices. Therefore, the number of threads is compared with the number of messages, and if the number of threads is less than the number of messages, it is determined that there is a disconnected smart device. Conversely, if the number of threads is equal to the number of messages, it is determined that there is no disconnected smart device. If there is a disconnected smart device, further calculate the difference between the number of threads and the number of messages, and the difference is the theoretical number of disconnected smart devices.

After it is determined that there is a disconnected smart device, the current connection smart device information of the currently connected smart device is acquired based on the current connection thread. Then, screening is performed based on the current connection smart device information and the stored smart device information. Specifically, the current connection smart device information is compared with the stored smart device information. Understandably, the current connection smart device information is a part of the stored smart device information. Therefore, after comparing and screening the two, if a certain stored smart device information is inconsistent with the current connection smart device information, the stored smart device information with inconsistent information may be marked as disconnected smart device information, and the corresponding smart device information may be marked as disconnected smart device information. Count the actual number of disconnected smart devices and compare the actual number with the theoretical number. If the actual number is the same as the theoretical number, it is determined that all disconnected smart devices have been obtained. If the actual number is not the same as the theoretical number, the inspection process is started, and the disconnected smart devices are searched again to find all disconnected smart devices.

Step S102, determining a corresponding wireless reconnection mode based on a disconnection duration, re-establishing a wireless connection with the disconnected smart device based on the wireless reconnection mode, and marking a wireless connection mode; and After determining the disconnected smart device, the disconnected smart device needs to be reconnected.

In details, determining the corresponding wireless reconnection mode based on the disconnection duration and re-establishing the wireless connection with the disconnected smart device based on the wireless reconnection mode includes:

acquiring the disconnection duration and comparing the disconnection duration with a preset duration;

if the disconnection duration is less than the preset duration, a disconnection mode is determined to be an instantaneous disconnection mode, and if the disconnection duration is greater than or equal to the preset duration, the disconnection mode is determined to be a medium-long disconnection mode;

if the disconnection mode is the instantaneous disconnection mode, the wireless reconnection mode is determined as: starting a countdown, when a duration of the countdown reaches an expected delay, initiating a connection request, and re-establishing the wireless connection based on the connection request and the disconnected smart device; and if the disconnection mode is the medium-long disconnection mode, the wireless reconnection mode is determined as: directly initiating the connection request and re-establishing the wireless connection with the disconnected smart device based on the connection request.

In this embodiment, the disconnection duration starts from the moment when the mobile terminal is disconnected from the disconnected smart device. The preset duration can be specifically set as required, for example, the preset duration can be set to 1 second, 2 seconds, etc. In this embodiment, the disconnection mode is determined by the disconnection duration: a disconnection mode whose disconnection duration is less than the preset duration is determined as the instantaneous disconnection mode, and a disconnection mode whose disconnection duration is greater than or equal to the preset duration is determined as a medium-long disconnection mode.

Because the disconnection durations of different disconnection modes are different, different wireless reconnection modes need to be set for the instantaneous disconnection mode and the medium-long disconnection mode. For the disconnection mode is the instantaneous disconnection mode, since the disconnection duration is very short, the wireless connection can be established after the disconnection duration reaches an expected delay. Specifically, the wireless reconnection mode is determined as: starting a countdown, when the countdown time reaches an expected delay, a connection request is initiated, and a wireless connection is re-established with the disconnected smart device based on the connection request. For the medium and long disconnection mode, since the disconnection duration has exceeded the preset duration, the wireless connection can be established directly. Specifically, the wireless reconnection mode is determined as: directly initiating a connection request and re-establishing a wireless connection with the disconnected smart device based on the connection request.

Further, initiating the connection request and re-establishing the wireless connection with the disconnected smart device based on the connection request includes:

acquiring the wireless connection mode of the disconnected smart device and extracting a verification information of a disconnected smart device information from a cache area; and sending the connection request comprising the wireless connection mode and the verification information to the disconnected smart device, such that the disconnected smart device performs connection verification based on the verification information and completes a re-establishment of the wireless connection after a verification is successful.

Understandably, establishing a wireless connection needs to be based on authentication information, and the connection can be successfully established after the authentication information is passed. In this embodiment, when establishing a wireless connection with the smart device for the first time, the verification information is stored corresponding to the smart device, so that it can be directly read and used when the wireless connection is automatically established.

In this embodiment, the wireless connection mode of the disconnected smart device is obtained, and the stored corresponding verification information is obtained from a cache area. For example, if the wireless connection mode of the disconnected smart device B is a Bluetooth connection, the corresponding verification information is a pairing key. If the wireless connection mode of the disconnected smart device C is data connection, the corresponding verification information is a connection password or identity verification information. After the corresponding verification information is obtained, a connection request including the wireless connection method and verification information is sent to the disconnected smart device for the disconnected smart device to perform connection verification based on the verification information, and the wireless connection is re-established after the verification is successful.

Further, before determining the corresponding wireless reconnection mode based on the disconnection duration, the method further includes:
  acquiring a network disconnection mode of the disconnected smart device, wherein the network disconnection mode comprises a normal disconnection and an abnormal disconnection; and
  if the network disconnection mode is the abnormal disconnection, performing a step of: determining the corresponding wireless reconnection mode based on the disconnection duration.

In this embodiment, the normal disconnection refers to disconnecting the wireless connection in response to a user operation or disconnecting the wireless connection when a preset disconnection condition is reached. The preset disconnection conditions include but are not limited to time and distance. Understandably, if the wireless connection mode is Bluetooth, the connection may be disconnected when the distance between the mobile terminal and the smart device exceeds the preset distance. In this embodiment, the disconnection caused by the distance change is marked as the normal disconnection. If the user triggers the disconnection indication on the mobile terminal or the smart connection device, the normal disconnection may also be performed based on the disconnection indication. If it is disconnected normally, there is no need to automatically initiate a wireless connection.

However, the mobile terminal and the smart device are often disconnected abnormally due to abnormal conditions such as abnormal system operation and temporary network interruption. It is the abnormal disconnection that greatly affects the user experience. Therefore, after an abnormal disconnection, an operation needs to be performed: a corresponding wireless reconnection mode is determined based on the disconnection duration, so as to realize the automatic connection of the wireless network.

Unless otherwise specified, the disconnected smart devices in this embodiment all refer to the abnormally disconnected smart connected devices.

Step S103, monitoring an external network and determining a data transmission mode based on the wireless connection mode and the external network for data transmission based on the data transmission mode with the reconnected disconnected smart device.

In this embodiment, the wireless connection mode includes a Bluetooth connection, a Wi-Fi connection, and a data connection. The external network includes 4G, 5G, and Wi-Fi. The data transmission mode includes a double-speed transmission mode and a normal transmission mode. 4G communication technology is the fourth generation mobile information system, which is a better improvement on 3G technology. Compared with 3G communication technology, it has a greater advantage, a data transmission speed is fast, and the application of 4G communication technology in intelligent communication equipment allows users to access the Internet faster. 5G refers to the fifth generation mobile communication technology (5th generation mobile networks or 5th generation wireless systems, 5th-generation, 5G or 5G technology for short). 5G is the latest generation of cellular mobile communication technology and an extension of 4G (LTE-A, WiMax), 3G (UMTS, LTE), and 2G (GSM) systems. The performance goals of 5G are high data rates, reduced latency, energy savings, lower costs, increased system capacity, and massive device connectivity. The speed of 5G can reach 20 Gbit/s, which has a wider channel bandwidth than 4G.

In this embodiment, determining the data transmission mode based on the wireless connection mode and the external network includes:
  if the wireless connection mode is the data connection mode and the external network is 5G, then the data transmission mode is determined as the double-speed transmission mode, and a data transmission rate in the double-speed transmission mode is determined according to a calculation result of multiplying a number of disconnected smart devices by a basic rate;
  if the wireless connection mode is the data connection mode and the external network is 4G or Wi-Fi, then the data transmission mode is determined as the normal transmission mode, and a data transmission rate in the normal transmission mode is determined according to the number of disconnected smart devices plus the calculation result of the basic rate; and
  if the wireless connection mode is the Bluetooth connection mode or the Wi-Fi connection mode and the external network is 5G, 4G or Wi-Fi, the data transmission mode is determined as the normal transmission mode.

For the 5G network, due to the characteristics of 5G itself, it has sufficient bandwidth and data transmission capacity. When the wireless connection mode is a data connection and the external network is 5G, the disconnected smart device and the mobile terminal perform data transmission through the 5G network, such that the 5G network can be fully utilized, and the data transmission mode is determined as the double-speed transmission mode. The data transmission rate in the double-speed transmission mode is determined by multiplying the number of disconnected smart devices by the base rate. The base rate may be a preset default rate or may be the current rate of the mobile terminal. When the wireless connection mode is data connection, the external network is 4G or Wi-Fi, or when the wireless connection mode is Bluetooth connection or Wi-Fi connection, and the external network is 5G, 4G, or Wi-Fi, because the advantages of 5G cannot be utilized, and the data transmission speed of 4G, Wi-Fi, and Bluetooth is prioritized, the data transmission mode can only be determined as the normal transmission mode. The data transmission rate in the normal transmission mode is determined according to the calculation result of the number of disconnected smart devices plus the basic rate.

Understandably, before the mobile terminal and the smart device are disconnected, the data transmission mode may also be determined based on the wireless connection mode and the external network.

Further, after monitoring the external network and determining the data transmission mode based on the wireless connection mode and the external network, the method further includes:

displaying a message uploaded by the smart device based on the data transmission mode in a preset message display field of a display interface of a mobile terminal; or reading data in a database of the smart device through a preset interface and displaying the data in a preset message display field of a display interface of a mobile terminal.

After the wireless connection is successfully established and the data transmission mode is determined, data interaction can be realized. In this embodiment, a control application program for controlling each smart device is correspondingly installed in the mobile terminal in advance, and items such as viewing, control, management, and monitoring of the smart device are realized through the control application program.

In this embodiment, a message display field may also be set in the display interface of the mobile terminal, and the message display field is used to display the message uploaded by the smart device. Alternatively, the data stored in the database of the smart device can also be read through a preset interface, and the data can be displayed in the message display field.

In this embodiment, through the above scheme, determining a disconnected smart device according to a current connection thread and a stored smart device information; determining a corresponding wireless reconnection mode based on a disconnection duration, re-establishing a wireless connection with the disconnected smart device based on the wireless reconnection mode, and marking a wireless connection mode; and monitoring an external network and determining a data transmission mode based on the wireless connection mode and the external network for data transmission based on the data transmission mode with the reconnected disconnected smart device. As a result, monitoring the wireless connection thread determines the disconnected smart device, automatically re-establishes a connection with the disconnected smart device, and transmits data according to the data transmission mode, which realizes the automatic connection of the smart device after the disconnection and ensures the normal operation of the smart device. The operation improves the user experience.

Figure 3:
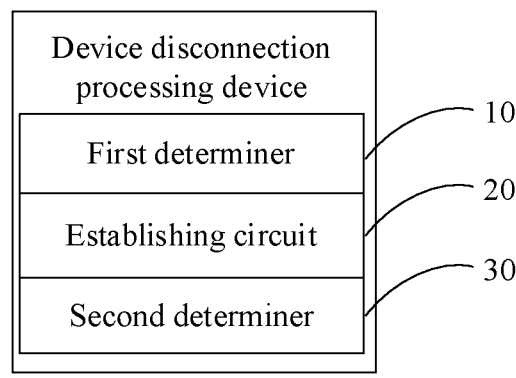
FIG. 3 is a schematic diagram of functional modules of the first embodiment of a device disconnection processing device according to the present application.

In addition, this embodiment further provides a device disconnection processing device. Referring to FIG. 3, FIG. 3 is a schematic diagram of functional modules of the first embodiment of a device disconnection processing device according to the present application.

In this embodiment, the device disconnection processing device is a virtual device, which is stored in the memory 1005 of the device disconnection processing device shown in FIG. 1 to realize all the functions of the device connection disconnection processing program: determining a disconnected smart device according to a current connection thread and a stored smart device information; determining a corresponding wireless reconnection mode based on a disconnection duration, re-establishing a wireless connection with the disconnected smart device based on the wireless reconnection mode, and marking a wireless connection mode; and monitoring an external network and determining a data transmission mode based on the wireless connection mode and the external network for data transmission based on the data transmission mode with the reconnected disconnected smart device.

Specifically, the device disconnection processing device includes:

a first determiner 10 configured to determine a disconnected smart device according to a current connection thread and a stored smart device information;

an establishing circuit 20 configured to determine a corresponding wireless reconnection mode based on a disconnection duration, re-establish a wireless connection with the disconnected smart device based on the wireless reconnection mode, and mark a wireless connection mode; and a second determiner 30 configured to monitor an external network and determine a data transmission mode based on the wireless connection mode and the external network for data transmission based on the data transmission mode with the reconnected disconnected smart device.

Further, the second determiner includes:

a first determining circuit configured to determine the data transmission mode as a double-speed transmission mode and determine a data transmission rate in the double-speed transmission mode according to a calculation result of multiplying a number of disconnected smart devices by a basic rate if the wireless connection mode is a data connection mode and the external network is 5G;

a second determining circuit configured to determine the data transmission mode as a normal transmission mode and determine a data transmission rate in the normal transmission mode according to the number of disconnected smart devices plus the calculation result of the basic rate if the wireless connection mode is the data connection mode and the external network is 4G or Wi-Fi; and a third determining circuit configured to determine the data transmission mode as the normal transmission mode if the wireless connection mode is a Bluetooth connection mode or a Wi-Fi connection mode and the external network is 5G, 4G or Wi-Fi.

Further, the establishing circuit includes:

a first acquiring circuit configured to acquire the disconnection duration and compare the disconnection duration with a preset duration;

a fourth determining circuit configured to: if the disconnection duration is less than the preset duration, a disconnection mode is determined to be an instantaneous disconnection mode, and if the disconnection duration is greater than or equal to the preset duration, the disconnection mode is determined to be a medium-long disconnection mode;

a fifth determining circuit configured to: if the disconnection mode is the instantaneous disconnection mode, the wireless reconnection mode is determined as: starting a countdown, when a duration of the countdown reaches an expected delay, initiating a connection request, and re-establishing the wireless connection based on the connection request and the disconnected smart device; and a sixth determining circuit configured to: if the disconnection mode is the medium-long disconnection mode, the wireless reconnection mode is determined as: directly initiating the connection request and re-establishing the wireless connection with the disconnected smart device based on the connection request.

Further, the first determiner also includes:

a second acquiring circuit configured to acquire one or more connected smart devices, and store a smart device information of the one or more smart devices, wherein the smart device information includes a device name and a device unique identifier; and a third acquiring circuit configured to acquire the wireless connection mode of the connected one or more smart devices and store the wireless connection mode in association with the smart device information.

Further, the first determiner includes:

a fourth acquiring circuit configured to acquire a number of threads of the current connection thread and acquire a number of information of stored smart device information;

a comparing circuit configured to compare the number of threads with the number of information and if the number of threads is less than the number of information, determine that there is the disconnected smart device;

a fifth acquiring circuit configured to acquire a current connection smart device information of a currently connected smart device based on the current connection thread; and a determining circuit configured to screen based on the current connection smart device information and the stored smart device information, acquire a smart device with missing information in the current connection smart device information, and determine the smart device with missing information as the disconnected smart device.

Further, the first determiner also includes:

an extracting circuit configured to acquire the wireless connection mode of the disconnected smart device and extract a verification information of a disconnected smart device information from a cache area; and a transmitter configured to send the connection request comprising the wireless connection mode and the verification information to the disconnected smart device, such that the disconnected smart device performs connection verification based on the verification information and completes a re-establishment of the wireless connection after a verification is successful.

Further, the first determiner also includes:

a sixth acquiring circuit configured to acquire a network disconnection mode of the disconnected smart device, wherein the network disconnection mode comprises a normal disconnection and an abnormal disconnection; and an execution circuit configured to: if the network disconnection mode is the abnormal disconnection, performing a step of: determining the corresponding wireless reconnection mode based on the disconnection duration.

Further, the second determiner also includes:

a first display configured to display a message uploaded by the smart device based on the data transmission mode in a preset message display field of a display interface of a mobile terminal; or a second display configured to read data in a database of the smart device through a preset interface and display the data in a preset message display field of a display interface of a mobile terminal.

In addition, the present application further provides a computer storage medium (referred to as storage medium), wherein a device disconnection processing program is stored on the computer storage medium, when the device disconnection processing program is run by the processor, the device disconnection processing method is executed.

Compared with the prior art, the present application discloses a device disconnection processing method and apparatus, a mobile terminal, and a storage medium. The method is applied to a mobile terminal, and the method comprises determining a disconnected smart device according to a current connection thread and a stored smart device information; determining a corresponding wireless reconnection mode based on a disconnection duration, re-establishing a wireless connection with the disconnected smart device based on the wireless reconnection mode, and marking a wireless connection mode; and monitoring an external network and determining a data transmission mode based on the wireless connection mode and the external network for data transmission based on the data transmission mode with the reconnected disconnected smart device. As a result, monitoring the wireless connection thread determines the disconnected smart device, automatically re-establishes a connection with the disconnected smart device, and transmits data according to the data transmission mode, which realizes the automatic connection of the smart device after the disconnection and ensures the normal operation of the smart device. The operation improves the user experience.

It should be noted that, throughout this disclosure, the terms "include", "comprise" or any other variations thereof are intended to encompass non-exclusive inclusions, so that a process, method, article, or system that includes a series of elements would include not only those elements, but it may further include other elements that are not explicitly listed or elements that are inherent to such processes, methods, articles, or systems. In the absence of extra limitations, an element defined by the phrase "includes a . . . " does not exclude the presence of additional identical elements in this process, method, article, or system that includes the element.

Sequence numbers of the embodiments disclosed herein are meant for the sole purpose of illustrative and do not represent the advantages and disadvantages of these embodiments.

Through the above description of the foregoing embodiments, those skilled in the art can clearly understand that the above methods of the embodiments can be implemented by means of software plus a necessary general hardware platform; they certainly can also be implemented by means of hardware, but in many cases, the former is a better implementation. Based on this understanding, the essential part of the technical solution according to the present application or the part that contributes to the prior art can be embodied in the form of a software product. Computer software products can be stored in a storage medium as described above (e.g., ROM/RAM, a magnetic disk, an optical disc) which includes instructions to cause a terminal device to perform the methods described in the various embodiments of the present application.

The foregoing description portrays merely some illustrative embodiments of the present application and are not intended to limit the patentable scope of the present application. Any equivalent structural or flow transformations based on the specification and the drawing of the present application, or any direct or indirect applications of the present application in other related technical fields, shall all fall within the protection scope of the present application.

What is claimed is:

1. A device disconnection processing method, wherein the method is applied to a mobile terminal, and the method comprises:

determining a disconnected smart device according to a current connection thread and a stored smart device information;

determining a corresponding wireless reconnection mode based on a disconnection duration, re-establishing a wireless connection with the disconnected smart device based on the wireless reconnection mode, and marking a wireless connection mode; and monitoring an external network and determining a data transmission mode based on the wireless connection mode and the external network for data transmission based on the data transmission mode with the reconnected disconnected smart device.

2. The method of claim 1, wherein before monitoring the external network and determining the data transmission mode based on the wireless connection mode and the external network, the method comprises:

receiving a connection request sent by a smart device, wherein the connection request carries information; and acquiring the wireless connection mode corresponding to the smart device according to the information, wherein the wireless connection mode comprises a Bluetooth connection mode, a Wi-Fi connection mode, and a data connection mode.

3. The method of claim 2, wherein the external network comprises 4G, 5G, and Wi-Fi, and the data transmission mode comprises a double-speed transmission mode and a normal transmission mode;

determining the data transmission mode based on the wireless connection mode and the external network comprises:

if the wireless connection mode is the data connection mode and the external network is 5G, then the data transmission mode is determined as the double-speed transmission mode, and a data transmission rate in the double-speed transmission mode is determined according to a calculation result of multiplying a number of disconnected smart devices by a basic rate;

if the wireless connection mode is the data connection mode and the external network is 4G or Wi-Fi, then the data transmission mode is determined as the normal transmission mode, and a data transmission rate in the normal transmission mode is determined according to the number of disconnected smart devices plus the calculation result of the basic rate; and if the wireless connection mode is the Bluetooth connection mode or the Wi-Fi connection mode and the external network is 5G, 4G or Wi-Fi, the data transmission mode is determined as the normal transmission mode.

4. The method of claim 1, wherein determining the corresponding wireless reconnection mode based on the disconnection duration and re-establishing the wireless connection with the disconnected smart device based on the wireless reconnection mode comprises:

acquiring the disconnection duration and comparing the disconnection duration with a preset duration;

if the disconnection duration is less than the preset duration, a disconnection mode is determined to be an instantaneous disconnection mode, and if the disconnection duration is greater than or equal to the preset duration, the disconnection mode is determined to be a medium-long disconnection mode;

if the disconnection mode is the instantaneous disconnection mode, the wireless reconnection mode is determined as: starting a countdown, when a duration of the countdown reaches an expected delay, initiating a connection request, and re-establishing the wireless connection based on the connection request and the disconnected smart device; and if the disconnection mode is the medium-long disconnection mode, the wireless reconnection mode is determined as: directly initiating the connection request and re-establishing the wireless connection with the disconnected smart device based on the connection request.

5. The method of claim 4, wherein initiating the connection request and re-establishing the wireless connection with the disconnected smart device based on the connection request comprises:

acquiring the wireless connection mode of the disconnected smart device and extracting a verification information of a disconnected smart device information from a cache area; and sending the connection request comprising the wireless connection mode and the verification information to the disconnected smart device, such that the disconnected smart device performs connection verification based on the verification information and completes a re-establishment of the wireless connection after a verification is successful.

6. The method of claim 1, wherein before determining the disconnected smart device according to the current connection thread and the stored smart device information, the method further comprises:

acquiring one or more connected smart devices, and storing a smart device information of the one or more smart devices, wherein the smart device information comprises a device name and a device unique identifier; and acquiring the wireless connection mode of the connected one or more smart devices and storing the wireless connection mode in association with the smart device information.

7. The method of claim 6, wherein acquiring the wireless connection mode of the connected one or more smart devices and storing the wireless connection mode in association with the smart device information comprises:

acquiring the wireless connection mode of the connected one or more smart devices according to a wireless connection list, wherein the wireless connection list comprises a plurality of lists, and the plurality of lists comprises the smart device information of the smart device; and storing the wireless connection mode in association with the smart device information.

8. The method of claim 1, wherein determining the disconnected smart device according to the current connection thread and the stored smart device information comprises:

acquiring a number of threads of the current connection thread and acquiring a number of information of stored smart device information;

comparing the number of threads with the number of information and if the number of threads is less than the number of information, determining that there is the disconnected smart device;

acquiring a current connection smart device information of a currently connected smart device based on the current connection thread; and screening based on the current connection smart device information and the stored smart device information, acquiring a smart device with missing information in the current connection smart device information, and determining the smart device with missing information as the disconnected smart device.

9. The method of claim 8, further comprising:
if there is the disconnected smart device, calculating a difference between the number of threads and the number of information, wherein the difference is a theoretical number of disconnected smart devices; and
counting an actual number of the disconnected smart devices, comparing the actual number with the theoretical number, and if the actual number is the same as the theoretical number, determining that all disconnected smart devices in mart devices corresponding to the stored smart device information have been acquired.

10. The method of claim 9, further comprising:
if the actual number is different from the theoretical number, starting an inspection process to search for disconnected smart devices, so as to find all disconnected smart devices from the smart devices corresponding to the stored smart device information.

11. The method of claim 1, wherein before determining the corresponding wireless reconnection mode based on the disconnection duration, the method further comprises:
acquiring a network disconnection mode of the disconnected smart device, wherein the network disconnection mode comprises a normal disconnection and an abnormal disconnection; and
if the network disconnection mode is the abnormal disconnection, performing a step of: determining the corresponding wireless reconnection mode based on the disconnection duration.

12. The method of claim 11, wherein acquiring the network disconnection mode of the disconnected smart device comprises:
if the wireless connection is disconnected in response to a user operation, the network disconnection mode is the normal disconnection; and
if the wireless connection is disconnected when a preset disconnection condition is reached, the network disconnection mode is the normal disconnection.

13. The method of claim 12, wherein if the wireless connection is disconnected when the preset disconnection condition is reached, the network disconnection mode is the normal disconnection, comprising:
when the wireless connection mode is Bluetooth and a distance of the smart device exceeds a preset distance, disconnecting the wireless connection; and
determining that the network disconnection mode of the disconnected smart device is the normal disconnection.

14. The method of claim 1, wherein after monitoring the external network and determining the data transmission mode based on the wireless connection mode and the external network, the method further comprises:
displaying a message uploaded by the smart device based on the data transmission mode in a preset message display field of a display interface of a mobile terminal.

15. The method of claim 1, wherein after monitoring the external network and determining the data transmission mode based on the wireless connection mode and the external network, the method further comprises:
reading data in a database of the smart device through a preset interface and displaying the data in a preset message display field of a display interface of a mobile terminal.

16. The method of claim 1, before the method, further comprising:
installing a control application program corresponding to the smart device; and
after the method, further comprising:
viewing, controlling, managing, and monitoring the smart device through the control application program.

17. A device disconnection processing device, comprising:
a first determiner configured to determine a disconnected smart device according to a current connection thread and a stored smart device information;
an establishing circuit configured to determine a corresponding wireless reconnection mode based on a disconnection duration, re-establish a wireless connection with the disconnected smart device based on the wireless reconnection mode, and mark a wireless connection mode; and
a second determiner configured to monitor an external network and determine a data transmission mode based on the wireless connection mode and the external network for data transmission based on the data transmission mode with the reconnected disconnected smart device.

18. The device of claim 17, wherein the second determiner comprises:
a first determining circuit configured to determine the data transmission mode as a double-speed transmission mode and determine a data transmission rate in the double-speed transmission mode according to a calculation result of multiplying a number of disconnected smart devices by a basic rate if the wireless connection mode is a data connection mode and the external network is 5G;
a second determining circuit configured to determine the data transmission mode as a normal transmission mode and determine a data transmission rate in the normal transmission mode according to the number of disconnected smart devices plus the calculation result of the basic rate if the wireless connection mode is the data connection mode and the external network is 4G or Wi-Fi; and
a third determining circuit configured to determine the data transmission mode as the normal transmission mode if the wireless connection mode is a Bluetooth connection mode or a Wi-Fi connection mode and the external network is 5G, 4G or Wi-Fi.

19. A mobile terminal, comprising:
a processor, a memory, and a device disconnection processing program stored in the memory, wherein when the device disconnection processing program is run by the processor, the processor is configured to:
determine a disconnected smart device according to a current connection thread and a stored smart device information;
determine a corresponding wireless reconnection mode based on a disconnection duration, re-establish a wireless connection with the disconnected smart device based on the wireless reconnection mode, and mark a wireless connection mode; and
monitor an external network and determining a data transmission mode based on the wireless connection mode and the external network for data transmission based on the data transmission mode with the reconnected disconnected smart device.

20. The mobile terminal of claim 19, wherein before the processor monitors the external network and determines the data transmission mode based on the wireless connection mode and the external network, the processor is configured to:

receive a connection request sent by a smart device, wherein the connection request carries information; and acquire the wireless connection mode corresponding to the smart device according to the information, wherein the wireless connection mode comprises a Bluetooth connection mode, a Wi-Fi connection mode, and a data connection mode.

\* \* \* \* \*